June 24, 1930.  E. HERKT  1,766,383

BED FOR VERTICAL INTERNAL COMBUSTION ENGINES

Filed Sept. 3, 1925

Inventor
Ernst Herkt

Patented June 24, 1930

1,766,383

UNITED STATES PATENT OFFICE

ERNST HERKT, OF KIEL, GERMANY, ASSIGNOR TO FRIED. KRUPP GERMANIAWERFT AKTIENGESELLSCHAFT, OF KIEL-GAARDEN, GERMANY

BED FOR VERTICAL INTERNAL-COMBUSTION ENGINES

Application filed September 3, 1925, Serial No. 54,361, and in Germany April 28, 1925.

The invention relates to vertical internal combustion engines of high power, especially for ships propulsion, and is concerned in particular with the mode of construction of the engine bed.

In known engines of this kind the connection of the working cylinder with the base plate of the engine bed is established by the aid of long tie rods arranged in the engine bed and passing from the cylinder cover down to the base plate. This arrangement, however, suffers from serious drawbacks inasmuch as, in particular due to the very restricted conditions of room on board ships, the assembling of the engine and the disassembling of the individual parts thereof, when the engine has to be repaired, are made very difficult or even impossible owing to those tie rods being of said great length.

Now the object of the invention is to obviate these drawbacks, and this object is attained, according to the invention, by subdividing the tie rods at least one time and by so arranging them with relation to one another that the part tie rods overlap each other to an extent which depends on the forces to be transmitted by the tie rods and on the material the engine bed is made of.

The accompanying drawing shows two embodiments of the subject-matter of the invention by way of example, the figures being vertical sections through the engine bed with the working cylinders in elevation.

The embodiment of Fig. 1 will be described first.

A denotes the base plate of the engine having mounted on it two column-shaped feet B on which a bridge-shaped middle piece C rests. The parts A, B, C are held together by tie rods M lodged within the feet B. The middle piece C, further, has resting on it an upper portion D which in its turn, serves to support the working cylinder K with cover L. Tie rods N passing within the members C D connect the parts C, D, K. The described subdivided tie rods are disposed, in accordance with the invention, so as to overlap each other to a considerable extent $x$.

Figure 1:
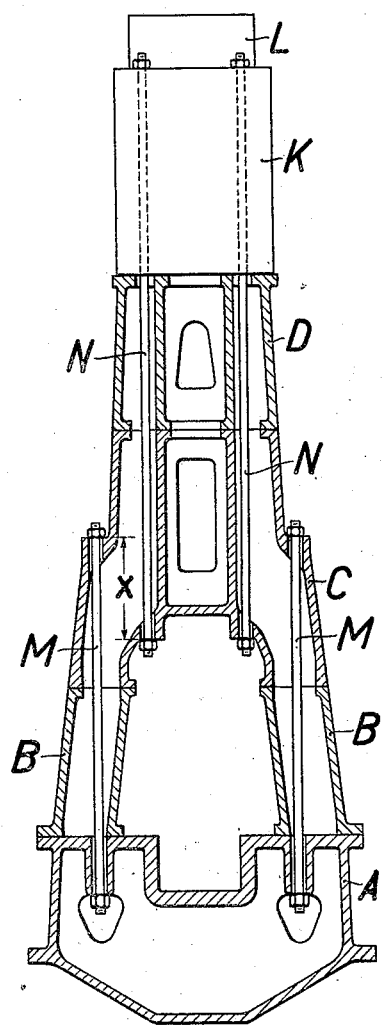
Figure 2:
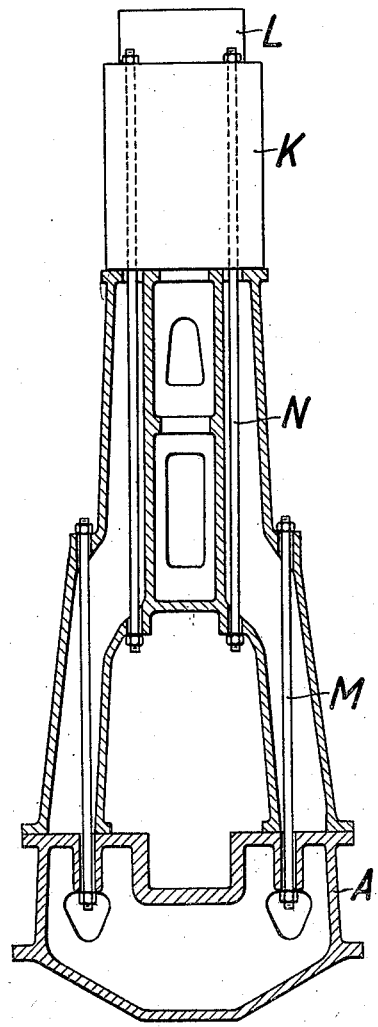

The embodiment shown in Fig. 2 differs from that described above merely by the engine bed being cast in one piece. The arrangement of the tie rods is the same as in the embodiment of Fig. 1.

By providing short part tie rods according to the invention it is possible, as the embodiment of Fig. 1 demonstrates, to provide a division of the engine bed too, without the solidity of the whole structure being interfered with, as would be the case with the tie rods hitherto known which pass from the cylinder down to the base plate of the engine. The subdivided tie rods further enable the engine to be assembled in a comparatively simple and easy manner, even with restricted conditions of room, as these short tie rods can be introduced more easily than the long tie rods, passing through the entire engine, of the construction hitherto known. Furthermore, the mutual overlapping of the part tie rods M, N offers a means for so choosing the conditions, by suitably determining the overlapping zone $x$, that the portion, lying in this zone, of the cast iron engine bed need not be strengthened in an inadmissibly high degree.

Claims:

1. A vertical internal combustion engine comprising a working cylinder, a standard supporting the working cylinder, a base plate on which said standard rests, tie rods connecting the cylinder to said standard, and tie rods connecting said standard to said base plate, said first-named tie rods overlapping said last-named tie rods.

2. A vertical internal combustion engine, comprising a working cylinder, a standard supporting the working cylinder, said standard comprising feet and an upper piece bridging said feet, a base plate on which said feet rest, tie rods connecting said feet and said bridge piece to said base plate, and tie rods connecting the cylinder to said bridge piece, said first-named tie rods overlapping said last-named tie rods.

The foregoing specification signed at Hamburg, Germany, this 11th day of August, 1925.

ERNST HERKT.